(12) United States Patent
Matsubara et al.

(10) Patent No.: US 6,269,669 B1
(45) Date of Patent: *Aug. 7, 2001

(54) SURFACE-TREATING METHOD FOR BACK PLATE FOR FRICTION MATERIAL

(75) Inventors: Tohru Matsubara, Niigata; Kazuhiro Seki, Gunma, both of (JP)

(73) Assignees: Nisshinbo Industries, Inc., Tokyo; Macoho Co., Ltd., Niigata, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,329

(22) Filed: Mar. 25, 1999

(30) Foreign Application Priority Data

Apr. 6, 1998 (JP) .................................... 10-092866

(51) Int. Cl.⁷ ..................................................... B21D 31/06
(52) U.S. Cl. .................................................................. 72/53
(58) Field of Search ................................. 72/53, 54, 39, 72/40, 46; 29/90.01, 89.5, 90.7; 451/38, 39, 40, 36

(56) References Cited

U.S. PATENT DOCUMENTS

| | | | |
|---|---|---|---|
| 4,115,076 | * 9/1978 | Hitzrot, Jr. | 51/320 |
| 5,193,375 | * 3/1993 | Meister | 72/53 |
| 5,456,628 | * 10/1995 | Csabai | 451/36 |
| 5,512,006 | * 4/1996 | Wood et al. | 451/39 |
| 5,673,473 | * 10/1997 | Johnson et al. | 72/53 |

\* cited by examiner

*Primary Examiner*—Lowell A. Larson
(74) *Attorney, Agent, or Firm*—Muramatsu & Associates

(57) ABSTRACT

Improvement in a method of surface-treating a back plate for friction material by blasting slurry containing particles made of plastic material through high pressure air to obtain desired surface roughness constantly for a long period of time. In the present method, no alumina grinding particle but particles made of stainless steel or titanium are fed into slurry, and the slurry is blasted through high pressure air to surface-treat the back plates. Stainless steel or the like strike works to make the surface thereof rough, which does not cause the stainless steel particles or titanium particles to be broken, unlike the grinding particles, so that the amount of sludge generated is reduced, resulting in longer life of the slurry.

4 Claims, 2 Drawing Sheets

SURFACE-TREATING METHOD FOR BACK PLATE FOR FRICTION MATERIAL

FIELD OF THE INVENTION

The present invention relates to a friction component for brakes and clutches for vehicles, and the like, and more particularly to a method of surface-treating a back plate of the friction material.

DESCRIPTION OF THE RELATED ART

A friction component, used for disk brake pads, brake shoes, clutch plates, and the like for automobiles is formed by integrally bonding a back plate made of ferric metal to friction material.

To the friction component is applied relative movement while being pressed between a disk rotor and a mated clutch plate, and frictional force generated at that moment causes an automobile to be stopped or driving force of an engine to be transmitted to wheels. As a result, considerably large sharing force is applied to the friction material and the back plate. Therefore, it is required to provide strong bonding force between the friction material and the back plate to bear the above-mentioned large sharing force.

In order to obtain strong bonding force to meet the above object, it has conventionally been carried out to make a bonding surface of the back plate rough to such an extent, as to be the surface roughness (average roughness on center line) Ra=2–7 $\mu$m to increase bonding surface and bonding force. Further, rust, oxidized film, or the like on the bonding surface of the back plate may cause the bonding force to be decreased, so that the both removal of the rust, the oxidized film and so on as well as rust preventing treatment are also important.

From this point of view, conventionally, the back plate, of which surface is made rough, and from which rust, oxidized film and the like are removed, is covered by forming film of zinc calcium phosphates of which thickness is approximately 3 $\mu$m to 5 $\mu$m, and then, primer material is spread on the film and is baked thereon to form a primer layer of approximately 15 $\mu$m to 25 $\mu$m. In other words, these forming film and primer layer function to prevent rust. On the other hand, bonding to the friction material is conducted through the primer layer and a newly applied bonding agent on the primer layer.

By the way, when the surface of the back plate is too rough, a portion of the back plate may penetrate the primer layer at the formation of the primer layer, which causes rust to be generated, and the rust may reach inside of the back plate. On the contrary, if the surface roughness of the back plate is too small, the improvement of bonding force can not, be expected. It is therefore the best to obtain maximum surface roughness so far as there is no fear that the primer layer is not penetrated. This preferable range is (Ra=)2 $\mu$m to 7 $\mu$m as described above.

Therefore, in the above-mentioned processes, the process of obtaining rough surface of the back plate is very important. Conventional method of obtaining rough surface is further described below.

Back plates are formed through striking process with a press from steel plate or the like, and on the surface of the steel plate or the like before formation or machining is attached rust, oxidized film, and the like. Further, at the striking process or the like, a great amount, of lubricant and rust preventing oil are adhered to the surface. The existence of the oil and oxidized film may reduce bonding force, so that it, is preferable to remove them.

Then, a back plate subjected to formation is firstly de-fatted with chlorine solvent to remove oil such as rust preventing oil. Then, with dry-grid-blast method, grid particles of cast iron are struck to the back plate through a rotor or the like to make the surface of the back plate rough up to Ra=2 $\mu$m to 7 $\mu$m described above, and at the same time, oxidized film and the like are removed. After that, forming film of zinc calcium phosphate is formed to prevent rust, and further primer material is applied thereon and is baked, then friction material is adhered thereto with bonding agent.

In the above-mentioned method, however, there are problems that remarkably large amount of lust is generated and chlorine solvent is used. To avoid these problems, wet-blasting method has been used. This method is advantageous also since blasting process and de-fatting are simultaneously carried out. In this method, many works are fed into a barrel, and while the barrel rotates the works are subjected to blasting treatment by blasting water (slurry) containing grinding particles to the works rotating in the barrel through high pressure air. The slurry is obtained by mixing alumina grinding particles, and further adding alkali de-fatter by about several percents thereto. This is a wet method, so that no dust is generated. In addition, alumina grinding particles are strong in grinding force, so that a prescribed surface roughness is achieve in a short period of time, and at the same time, with this method, de-fatting function is preferably provided due to the mixing of alkali de-fatter.

However, with this method, alumina is hard and brittle, so that when blasted to the works the alumina grinding particles are liable to be broken, resulting in generation of dusts and sludge. Further, edge portions generated at, the break sometimes become remarkably sharp, and the sharp edges penetrate the back plate and remains on the surface of the works, causing bonding force to be lowered. In addition, alumina grinding particles are repeatedly used, but the alumina particles recovered become drastically smaller and smaller as they are broken, which increases the amount of slurry and finally desired surface roughness can not be obtained. As a result, alumina grinding particles must be replaced every two weeks. In this case, slurry containing alumina must, have totally been replaced and waste fluid must be disposed as industrial waste.

Further, with the above-mentioned method, the directions of the works in the barrel are scattered in all directions, so that the directions of the works must manually be adjusted on a conveyor one by one just before sending the next process, therefore, it is impossible to reduce manpower and the efficiency itself is not good.

Still further, since material to be treated after blasting is zinc calcium phosphate, waste fluid treating facility unfavorably becomes large.

SUMMARY OF THE INVENTION

The present invention has been made in consideration of the above-mentioned fact, and it is therefore an object of the present invention to provide a method of surface-treating back plates of friction material in which desired surface roughness is securely obtained for a long period of time. Further object of the present, invention is to provided the method to automatically transport works from blasting process to the next. Still further object of the present invention is to provide the method with which waste fluid treating facility is made small even when forming treatment is conducted.

To achieve the above objects, a surface-treating method for a back plate for friction material according to the present invention is characterized in that slurry containing particles made of plastic material is blasted through high pressure air to a surface of a back plate for friction material.

It is possible to arrange the back plates on a conveyor and blast the slurry containing the particles made of plastic material through high pressure air from upside of the conveyor.

After the above surface treatment, de-fatting may be conducted on the extension of the conveyor, and then, forming treatment with phosphate may be carried out; the above-mentioned plastic material may be substantially ball-shaped; and the plastic material may be stainless steel or titanium.

Further, in the above method, the back plate for friction material can be made of ferric metal; the slurry may repeatedly be used through a circulation route; it is possible to install a magnet on the circulating route of the slurry; and ferric rust, steel powder and the like in the slurry can be removed through magnetic force.

BRIEF DESCRIPTION OF THE DRAWINGS

The present invention will be more apparent from the ensuring description with reference to the accompanying drawings, wherein.

DETAILED DESCRIPTION OF THE INVENTION

Next, embodiments of the surface-treating method for a back plate for friction material according to the present, invention will be explained with reference to drawings. With the present invention, the surface of back plates of friction material is made rough through wet blasting. Slurry used for the blasting includes 15 percents of stainless steel particles, and water with several percents of alkali de-fatter. The stainless steel particles are obtained by cutting a stainless steel wire of 0.3 mm diameter and rounding edges thereof to form substantially ball-shaped particles.

Figure 1:
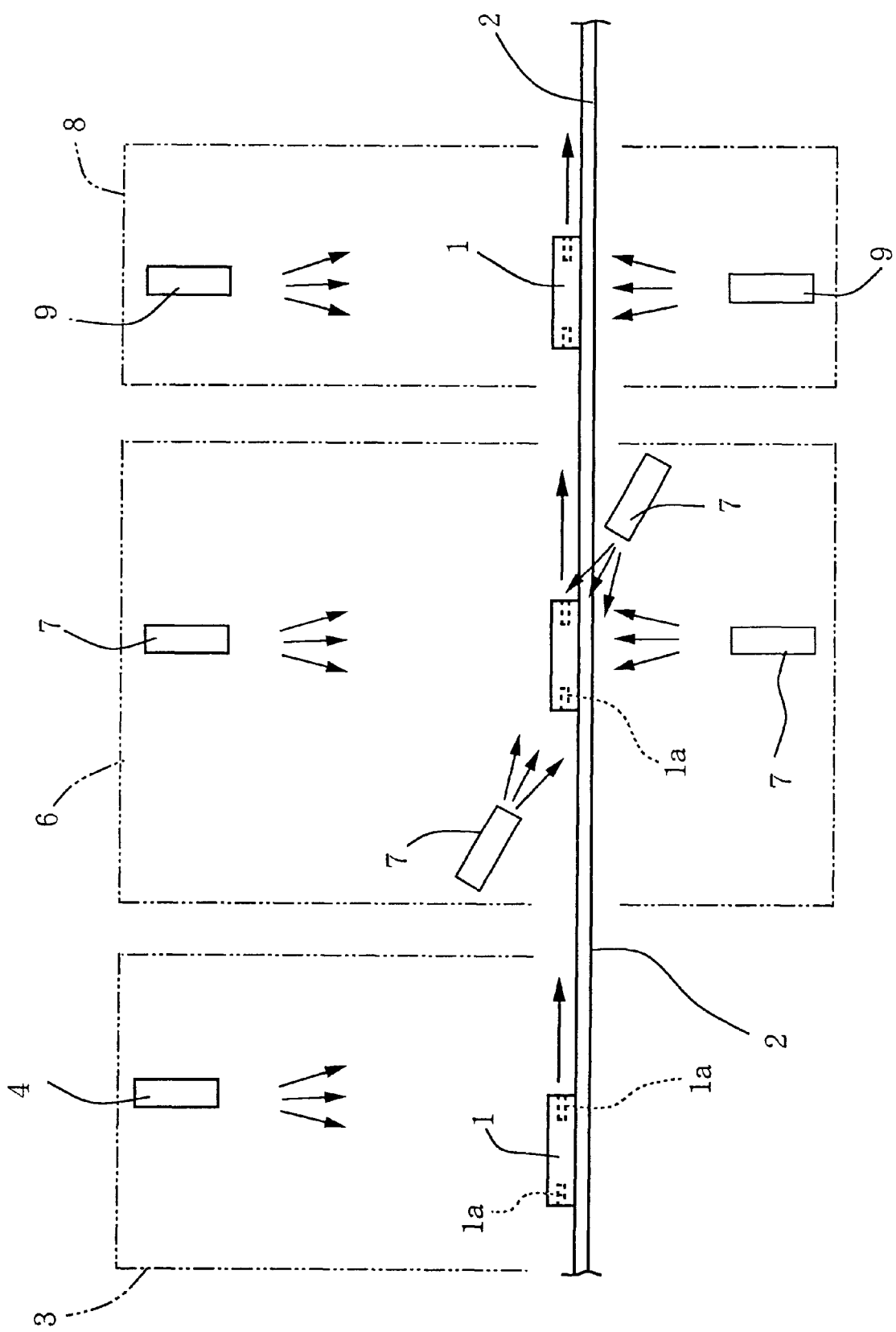
FIG. 1 is a drawing for explaining a method, according to the present invention, of transporting back plates for friction material and treating them one after another.

FIG. 1 is a drawing for explaining a method, according to the present, invention, of transporting back plates for friction material and treating them one after another. Back plates for disk brakes are described as an example of works 1. The works 1 are transported on a conveyor 2 in the direction indicated by arrows with the directions of the works being adjusted to be one direction. The conveyor 2 is made of net or drainboard, so that liquid such as slurry fed on the conveyor 2 will not remain thereon and the liquid totally falls and is recovered for repeat use through circulation.

The moment the work 1 enters blasting zone 3 and positions under a nozzle 4, the above-mentioned slurry is blasted to the work 1 from the nozzle 4 with compressed air, and impact, of stainless steel particles, which are mixed in the slurry, allows oxidized film or the like to be peeled off and the surface of the work 1 to be made rough. At this moment, oil adhered to the surface is also removed, and alkali de-fatter prevents the removed oil from being adhered to the surface again and the generation of rust. One or more nozzles 4 are arranged in a longitudinal direction of the conveyor 2, and when the work 1 passes under the nozzle 4, necessary and sufficient blasting treatment is applied to the work 1.

Figure 2:
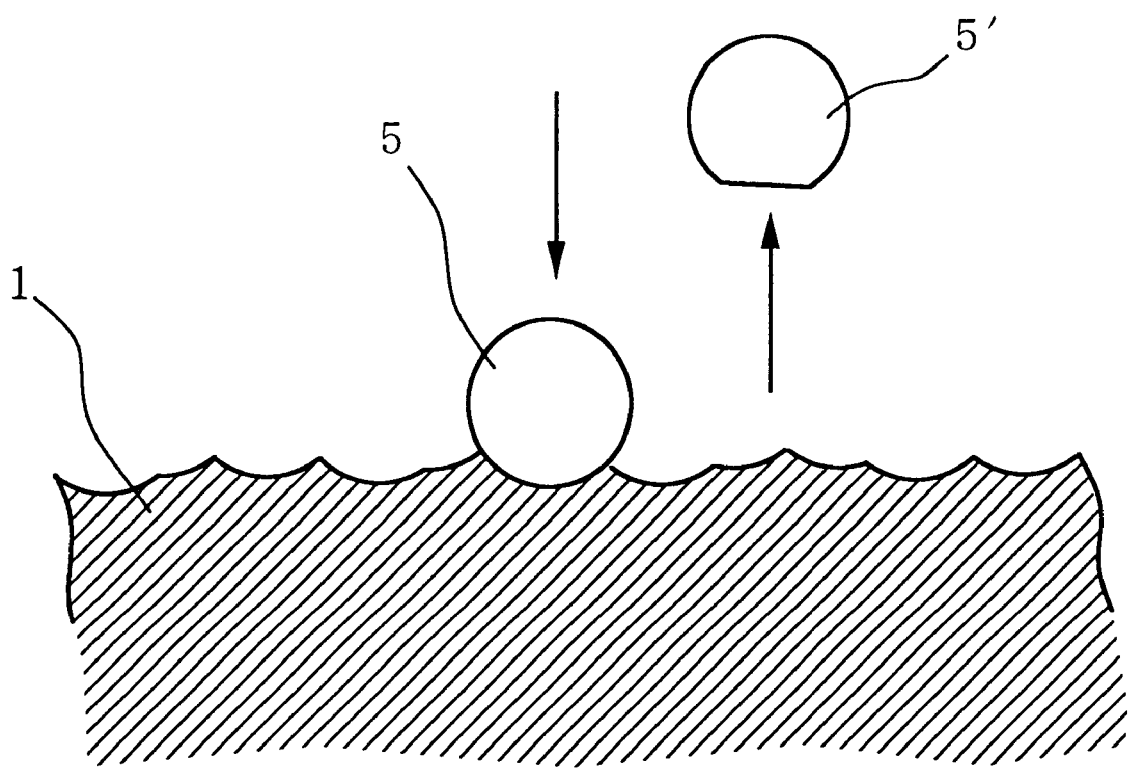
FIG. 2 is an enlarged view of the surface of a work which is made rough with stainless steel particles.

FIG. 2 shows the condition that stainless steel particles 5 strike the surface of the work 1. The hardness of the stainless steel particles 5 is approximately Hv500. and that of the work 1 is approximately Hv150, therefore, the stainless steel particles are harder, and the collisions of the stainless steel particles provide the same effect as numberless small hammers strike the surface of the work 1. Since oxidized film and the like coating the surface of the work 1 are dull they are peeled off and fall due to the impact, of the stainless steel particles. Then, due to the following strikes, the surface of the work 1 is coated with numerous round depressions, that, is, the surface is made rough. The stainless steel particles are substantially ball-shaped, that is, they have no projecting portions, so that the surface of the work 1 becomes evenly rough. At this moment, the surface roughness is adjusted to be Ra=2 $\mu$m to 7 $\mu$m (Ra: average roughness on center line) to obtain maximum surface roughness so far as there is no fear that the primer layer with the thickness of approximately 15 $\mu$m to 25 $\mu$m is not, penetrated.

As described above, since the stainless steel particles 5 are harder than the work 1, when colliding with the work 1 the stainless steel particles 5 depress the work 1. But, repeated collisions cause the stainless steel particles themselves to be deformed more or less. However, the deformation of the stainless steel particles is small as illustrated in FIG. 2, and the shape thereof scarcely changes to such an extent as considerably different, from a ball. Further, due to its tenacity, the stainless steel particles are rarely broken. As a result, the amount of sludge generated is remarkably reduced, which allows surface treatment of the works to be carried out under stable conditions for a period five times longer than that using alumina particles. Therefore, the quality of the works becomes stable and is improved, and the amount of industrial waste generated is remarkably reduced.

Moreover, unlike alumina particles are used, the works are not ground in the present, invention, but the works are deformed through striking, so that the surface of the works 1 is improved in fatigue stress and becomes physically stable in surface strain stress due to peening effect. Further, the works are subjected to work hardening effect and simultaneously the texture of the works 1 becomes minute and uniform, which improves rust preventing function of the works 1. Further, the stainless steel particle 5 seldom penetrates the work 1 and remains therein.

When the stainless steel particles 5 collide with the work 1, not, only oxidized film and the like covering the work 1 are peeled off, but also fine steel powder scatters from the work 1, and the steel powder is mixed in the slurry. But, the oxidized film as well as the steel powder are magnetic bodies, which are removable with magnet. Then, a magnet installed at, any portion of the circulating route of the slurry allows those oxidized film and steel powder to be removed from the slurry with ease, resulting in longer life of the slurry.

As illustrated in FIG. 1, the work 1 is provided with a hole 1a at a side surface thereof, and the hole 1a extends in a direction parallel to the transporting surface of the conveyor. When the work 1 is used for a disk brake, an end of a spring, which is used to forcedly remove a brake pad from a disk rotor, is inserted into the hole 1a.

In the prior art, works have been subjected to blasting while the works being rotated in a barrel. As a result, it might well be that grinding particles will enter the hole 1a. On the contrary there was a fair chance for insufficient de-fatting in the hole 1a. On the other hand, in the present invention, works are transported on a conveyor and the hole 1a is horizontally opened, so that particles including stainless steel particles do not enter the hole 1a. Further, as described below, de-fatting process is carried out as the next, step, which makes it possible to sufficiently de-fat, inside of the hole 1a.

The works 1 on the conveyor 2 shown in FIG. 1 is subjected to blasting from the nozzle 4, and is further transported to enter the de-fatting zone 6. In the zone, nozzles 7 are arranged above and below the conveyor 2 and upper left and lower right to allow the work to have shower of de-fatter to upper and lower surfaces thereof and from upper left and lower right thereof. Since the upper surface of the work 1 is de-fatted in the blasting process, the upper nozzle may be omitted, that, is, only the lower nozzle and the inclined nozzles manage to de-fat, the overall work 1 including the hole 1a.

The work 1 is further moved on the conveyor 2 to enter forming treatment zone 8. Here are also nozzles 9 above and below the conveyor 2, and treatment liquid is applied to the work 1 from upper and lower sides thereof to form a thin film of ferric phosphate. The forming process with zinc calcium phosphate necessitates a large waste fluid treatment facility since zinc as a heavy metal is contained and the amount of sludge generated is remarkably increased. However, with ferric phosphate, the amount of sludge is reduced, which makes the waste fluid treatment facility small, resulting in reduced cost for facilities.

Further, with ordinary blasting with alumina grinding particles, all the portions where the slurry flows are subject to grinding. As a result, pumps for circulating the slurry and nozzles discharging the slurry are subjected to strong abrasion, which shortens the life of those equipment. On the other hand, in the present invention, stainless steel particles, with little grinding action, are adopted to remarkably lengthen the life of the pumps and nozzles. As a result, cost is to be reduced from this point, of view also.

Although stainless steel particles are used in the above embodiment, any other suitable particles made of plastic material may be used in place of the stainless steel particles. "Plastic material" is defined here as a material with appropriate tenacity. and when the material collides with works at, blasting it plastically deforms but does not grind the works, so that sludge containing fine particles is rarely generated. However, the hardness of the material is desired to be higher than that of the works. Therefore, when selected from metal particles, besides stainless steel particles, titanium particles may be used. In comparison to stainless steel particles, titanium particles hardly deform and provide little grinding effect, which allows the life of the slurry to further be lengthened.

As described above, in the present invention, slurry containing particles made of plastic material is blasted through high pressure air to the surface of a back plate for friction material, so that the particles plastically deform but are rarely ground, and the particles do not pierce the surface of the work to remain thereon, therefore, bonding force is not decreased. Further, desired surface roughness is constantly obtained for a long period of time. In addition, the amount of sludge generated is remarkably reduced, which lengthens the life of the slurry. With titanium particles in place of stainless steel particles, the life of the slurry becomes longer.

When the back plates are arranged on a conveyor, and the slurry containing particles made of plastic material is blasted through high pressure air from upside of the conveyor, the back plates are automatically transported to the next process.

Substantially ball-shaped plastic material and stainless steel particles described above provide uniform rough surface and stable quality due to no projecting portions.

Ferric metal back plates; repeated use of the slurry through circulation; a magnet on the circulation route of the slurry, and removal of ferric rust steel powder and the like in the slurry through magnetic force lengthen the life of the slurry.

What is claimed is:

1. A method of surface-treating a back plate for friction material, comprising the steps of:

positioning a back plate made of steel plate for bonding friction material thereon; and blasting slurry containing particles made of stainless steel or titanium through high pressure air to a surface of said back plate.

2. The method of surface-treating a back plate for friction material as claimed in claim 1, wherein said step of positioning said back plate includes a process of arranging back plates on a conveyor, and said step of blasting said slurry includes a process of blasting said slurry containing particles made of stainless steel or titanium through high pressure air from upside of the conveyor.

3. The method of surface-treating a back plate for friction material claimed in claim 2, after said step of blasting said slurry on said back plates, said method further comprising the steps of:

defatting surfaces of said back plates; and applying forming treatment on said surfaces of said back plates with phosphate.

4. The method of surface-treating a back plate for friction material as claimed in claim 1, wherein said step of blasting said slurry on said back plate includes the steps of:

repeatedly using said slurry by circulating said slurry through a circulation route;

installing a magnet in the circulating route of the slurry; thereby removing ferric rust, steel powder and oxidized films in the slurry produced through said blasting step by magnetic force of said magnet.

* * * * *